United States Patent [19]

Lapinski et al.

[11] Patent Number: 5,763,116
[45] Date of Patent: Jun. 9, 1998

[54] NICKEL HYDROGEN BATTERY APPARATUS

[75] Inventors: John R. Lapinski, St. Charles; John P. Buck, Jr., St. Louis, both of Mo.

[73] Assignee: McDonnell Douglas Corporation, St. Louis, Mo.

[21] Appl. No.: 799,574

[22] Filed: Feb. 12, 1997

[51] Int. Cl.[6] ........................................ H01M 2/10
[52] U.S. Cl. .......................... 429/99; 429/159; 429/160
[58] Field of Search ................................ 429/96, 99, 100, 429/159, 160, 149, 153, 163

[56] References Cited

U.S. PATENT DOCUMENTS

| | | | |
|---|---|---|---|
| 5,034,290 | 7/1991 | Sands et al. | 429/160 X |
| 5,225,294 | 7/1993 | Schifrin | 429/99 |
| 5,264,303 | 11/1993 | McCaffery | 429/99 |
| 5,268,242 | 12/1993 | Morandi | 429/99 |

Primary Examiner—Anthony Skapars
Attorney, Agent, or Firm—Robert Westerlund

[57] ABSTRACT

A battery apparatus which includes a battery housing having a plurality of battery cell receptacles, each of the battery cell receptacles having an inwardly tapered opening. A plurality of battery cells are respectively inserted in the battery cell receptacles, and electrodes of each battery cell are connected via wires or bus bars to electrodes of another battery cell. A collar is secured to and surrounds each of the plurality of battery cells, the collar being located at a central portion of the battery cells. A portion of the collar is inwardly tapered, with the inward taper of the battery cell receptacle matching the inward taper of the collar. Retaining tabs secure each battery cell and its respective collar to the battery housing. An adhesive material is applied to a surface of the central portion of each battery cell, with the adhesive material bonding to an inner surface of the respective collar. An electrically insulating material is also embedded in the adhesive material.

23 Claims, 6 Drawing Sheets

NICKEL HYDROGEN BATTERY APPARATUS

BACKGROUND OF THE INVENTION

The present invention relates generally to a battery apparatus, and more particularly, to a Nickel Hydrogen battery whose cell capacity and physical structure may be easily modified, depending on a particular battery application or geometric requirement.

Nickel Hydrogen ($NiH_2$) batteries have been operational on satellites in geosynchronous orbits (GEO) for many years. See generally, Miller, L. E., *The $NiH_2$ Battery System: A Space Flight Application Summary*, Proceedings of the 23rd Intersociety Energy Conversion Engineering Conference, August 1988. GEO satellites are located approximately 22,000 miles above the earth in an orbit that allows the satellite to maintain its same relative position over a particular point on the earth.

The existing literature reports at least one operational Low Earth Orbit (LEO) satellite using $NiH_2$ batteries, the Hubble Space Telescope. See Whitt, T. H. and Lanier, J. R., *Hubble Space Telescope $NiH_2$ Six Battery Test*, Proceedings of the 1990 NASA Aerospace Battery Workshop, December 1990; and Brewer, J. C. and Whitt, T. H., *Hubble Space Telescope Nickel-Hydrogen "Flight Spare" Battery Test*, Proceedings of the 1990 NASA Aerospace Battery Workshop, December 1990. In addition to the Hubble Space Telescope (HST), the Space Station design incorporates $NiH_2$ batteries.

LEO satellites normally operate at approximately 300–500 miles above the earth's surface in either a full-sun or eclipsing orbit. In general, for an eclipsing orbit, LEO operation is more stressful to a battery than GEO operation, requiring more cycling (5000+cycles per year), higher discharge and charge rates, and increased exposure to temperature variations.

When compared to Nickel Cadmium (NiCd) batteries that are currently used in LEO satellites, $NiH_2$ batteries offer greater tolerance to varying conditions by being less sensitive to overcharge. $NiH_2$ batteries also provide a higher usable Depth of Discharge (DOD), and a lower total weight. The $NiH_2$ battery, therefore, has been selected as the next generation battery for LEO satellites because it provides more energy per pound and has a longer lifetime compared to NiCd batteries.

The $NiH_2$ battery's performance, like that of the NiCd battery, is a function of temperature, since the cell voltages and cell capacities are strongly dependent on the temperature. The HST battery design is based on a modest DOD of about 8%, thus providing a more reliable system than the NiCd battery, which typically has a DOD of 15% to 25%, but the HST design does not take full advantage of the $NiH_2$ features, for reasons which will become apparent hereinafter.

The basic design of the HST battery is a cylindrical "coffee can" collar mounted around each cell. Each collar assembly is then mounted to a base plate. The HST battery baseplates are then mounted to an access door which is passively cooled to the space environment while maintaining the batteries between the temperatures of 0° C. and 20° C.

A proposed power system for the Space Station incorporates another $NiH_2$ battery design. See Price, R. O., *Space Station Energy Storage System Development*, Aerospace Engineering, November 1988. This Space Station battery design will provide a 35% DOD with an expected life of five years, for a total of 42,000 cycles. This design also uses the "coffee can" collar concept, with each collar assembly being directly mounted to the Orbital Replaceable Unit (ORU) structure. The Space Station battery is different from the HST battery since an active coolant loop maintains its temperature between 0° C. and 10° C.

The HST battery design, however, treats each cell separately and requires more uniform heat rejection from the mounting surface, thereby maintaining each cell within a reasonable temperature range across the battery. The Space Station battery design also treats each cell separately, and the requirements on its mounting surface increase the difficulty of the design. More particularly, the Space Station mounting surface requires uniform heat rejection for the battery as well as being orbitally replaceable with the battery installed.

In light of the foregoing, there exists a need for a battery that is easy to assemble, easy to adapt to specific geometric and different configuration requirements, and that acts as a single mass both thermally and structurally.

SUMMARY OF THE INVENTION

The present invention is therefore directed to a nickel hydrogen battery apparatus having several novel features which substantially overcome one or more of the problems due to the limitations and disadvantages of the related art.

In general, each battery cell is mounted to a tapered collar with an electrically isolating fiberglass wrap embedded within the bonding material between the collar and a battery housing. Each cell/collar assembly is mounted directly into the battery housing. The battery housing contains many battery cell receptacles, with each battery cell receptacle having a tapered portion that matches the taper of the collar to ensure a secure fit and reliable interface. The battery thus acts as a single mass, both thermally and structurally.

The present invention encompasses a battery apparatus which includes: a battery housing having a plurality of battery cell receptacles, each of the battery cell receptacles having an inwardly tapered opening; a plurality of battery cells inserted in respective ones of the battery cell receptacles; a plurality of collars secured to and surrounding respective ones of the battery cells, each collar being located at a central portion of a respective one of the battery cells, and having an upper portion extending a prescribed distance above a plane defined by a top of the battery housing and a lower portion extending below the top plane of the battery housing, the lower portion of the collar being inwardly tapered, the inward taper of the battery cell receptacle matching the inward taper of the lower portion of the collar; interconnect means for electrically interconnecting at least selected ones of the battery cells to one another; and a plurality of retaining tabs for securing respective ones of the battery cells and the collars to the battery housing.

The battery apparatus further includes an adhesive material applied to the surface of the central portion of each battery cell, with the adhesive material bonding to an inner surface of the respective collar. An electrically insulating material, consisting of a fiberglass wrap, is embedded in the adhesive material.

The $NiH_2$ battery apparatus of the present invention is easy to fabricate, assemble, and repair. Upon receipt of the $NiH_2$ battery cells, the collars can be mounted to the cells, even before selection of their position within the battery assembly. This can be accomplished since "clocking" of the cell's electrodes relative to attachment within the battery can be done during cell/collar installation into the battery housing.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility.

The present invention is directed to an easily configured and customized battery design for use in satellites, whether GEO or LEO, as well as ground or other airborne applications. The number of cells in the battery design is easily scaled up or down, depending on the application. Also, the physical battery footprint can be easily altered to fit within a given geometric requirement of the ground or airborne structure.

Figure 1A:
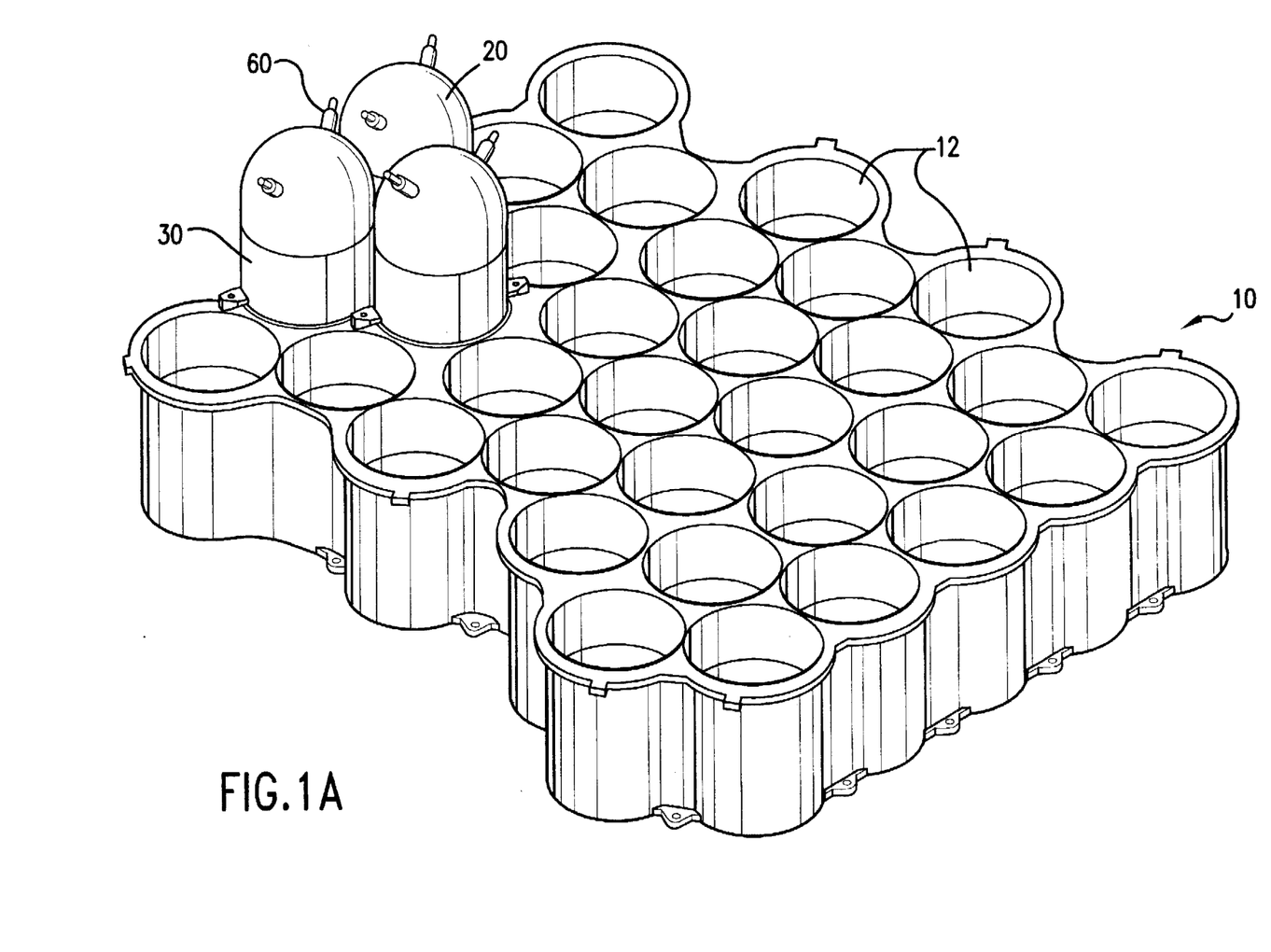
FIG. 1A is a perspective view of a 33 cell battery housing according to the present invention.
Figure 1B:
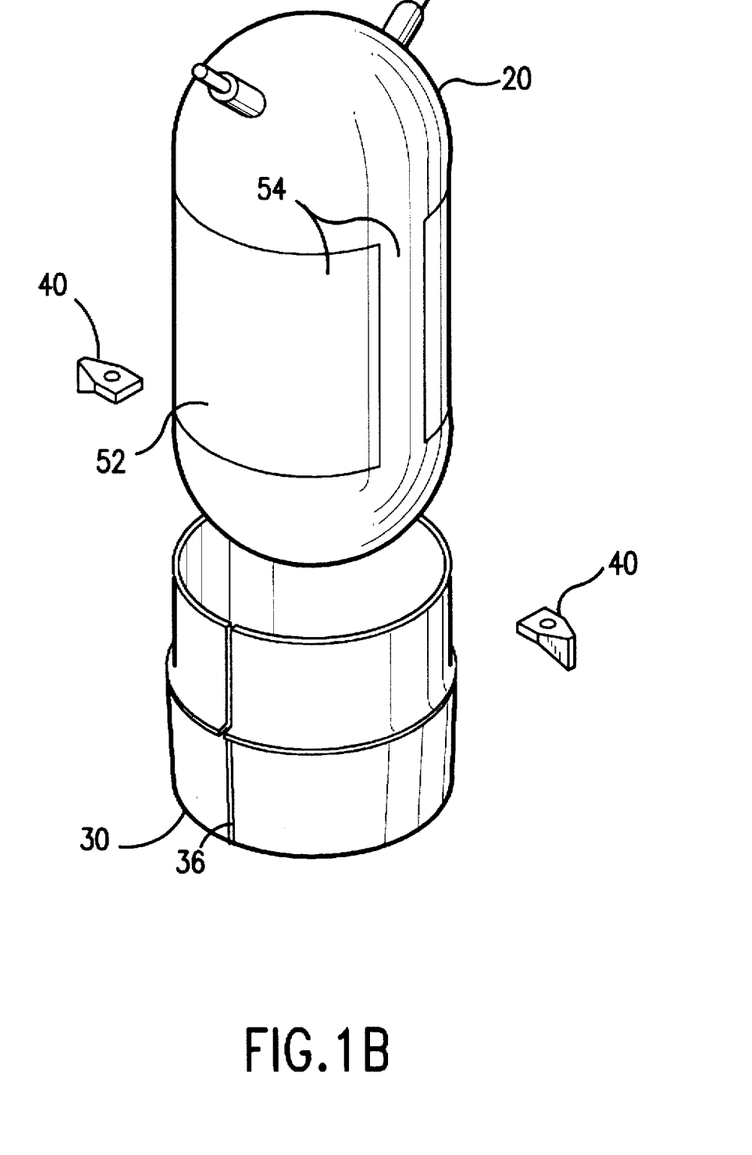
FIG. 1B is an exploded perspective view of the $NiH_2$ cell subassembly of the battery apparatus according to the present invention.
Figure 2:
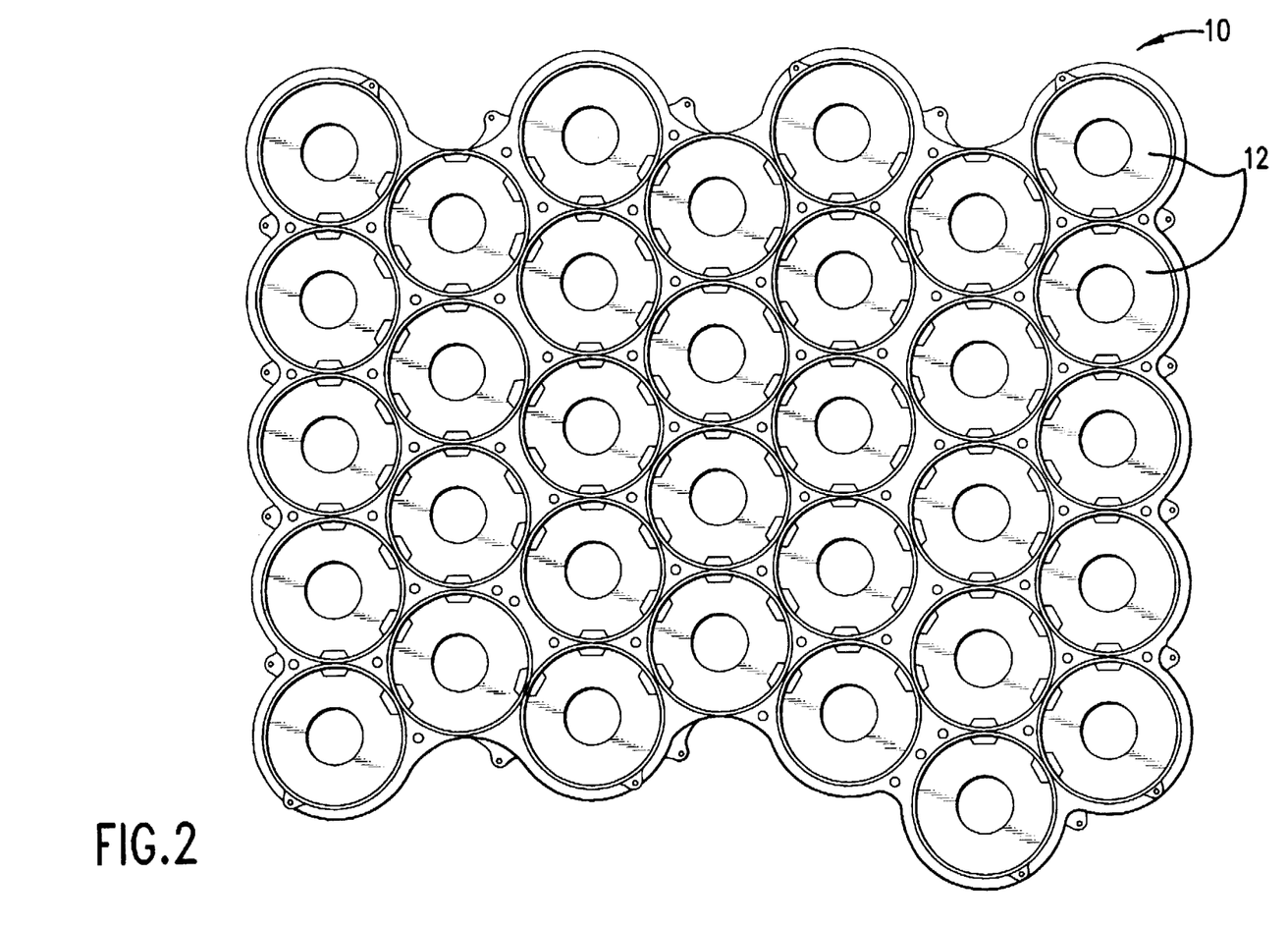
FIG. 2 is a top view of the battery housing of FIG. 1.

FIGS. 1A and 1B illustrate an exemplary battery housing 10 and its associated battery cell 20 in accordance with the present invention. In the embodiment illustrated, the battery housing 10 provides 33 cylindrical battery cell receptacles 12 to house a like number of battery cells 20. It is understood, however, that the battery housing 10 can be scaled up or down depending on the number of cells 20 required for a particular ground or spacecraft application. Also, the footprint depicted in the perspective (FIG. 1A) and top (FIG. 2) views of the battery housing 10 is exemplary only, it being understood that the footprint of the housing 10 may be modified to meet the geometric requirements of the particular structure. For example, the housing 10 may comprise three rows of eleven cells resulting in a long and thin footprint, or the housing 10 may comprise a combination of three rows of five cells with three rows of six cells resulting in a more square footprint. Circular and other geometric configurations are also contemplated within the scope of the present invention. Furthermore, some or all of the battery cell receptacles 12 may be vertically stacked. The housing is preferably made of aluminum, which can be machined from an aluminum billet. For space applications, excess metal may be removed to lighten the housing.

Figure 3:
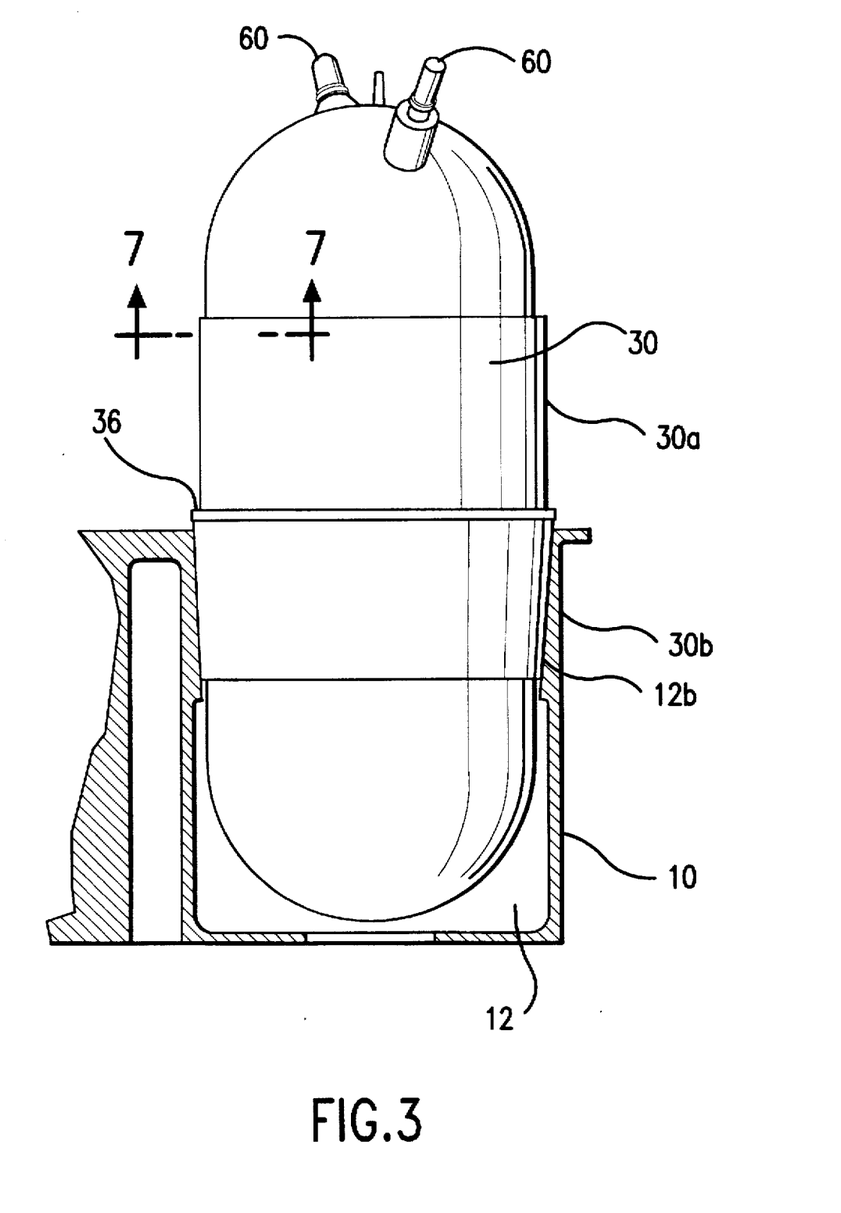
FIG. 3 is a side view of one cell/collar assembly mounted in the battery housing.

Each cell assembly 20 is basically a cylindrical independent pressure vessel $NiH_2$ battery cell which can be procured from several commercial sources. The cell assembly 20 may also be a common pressure vessel. As shown in FIGS. 1B, 3, and 4A–4C, the battery cells 20 are mounted in individual cell collars 30. The cell collars 30 are made of aluminum and can be easily fabricated or machined directly from stock material. The symmetry of the collar 30 allows the cells 20 to be installed into the collars 30 early in the battery construction process. The symmetry also minimizes cell positioning efforts required during the bonding of the cell 20 to the cell collars 30 and during battery assembly since any cell 20 can be placed in any battery cell receptacle 12. FIG. 1B is an exploded perspective view of the cell 20 and collar 30 and FIG. 3 shows the cell/collar assembly mounted in a battery cell receptacle 12.

As shown in FIG. 3, the collar 30 is mounted so as to surround each of the battery cells 20 at approximately a central location on the battery cell 20. When placed in the battery housing 10, the collar 30 has an upper portion 30a that extends a fixed distance above a plane defined by the top of the battery housing 10, and a lower portion 30b extending below the top plane of the battery housing 10. The lower portion 30b of the collar 30 is inwardly tapered. See also FIG. 4C. This inward taper of the collar 30 matches the inward taper 12b of the battery cell receptacle 12 as shown in FIG. 3, thereby ensuring a secure fit between the battery cell 20 within the housing 10. The close contact provided by the matching tapers provides an excellent thermal path from the battery cell 20 to the battery housing 10 with a minimum number of fasteners required. The close contact between the battery cells 20 and the battery housing 10 also allows the housing to act as a thermal buffer, minimizing the deviation or spread in cell to cell temperatures for a given heat rejection surface.

Figure 6:
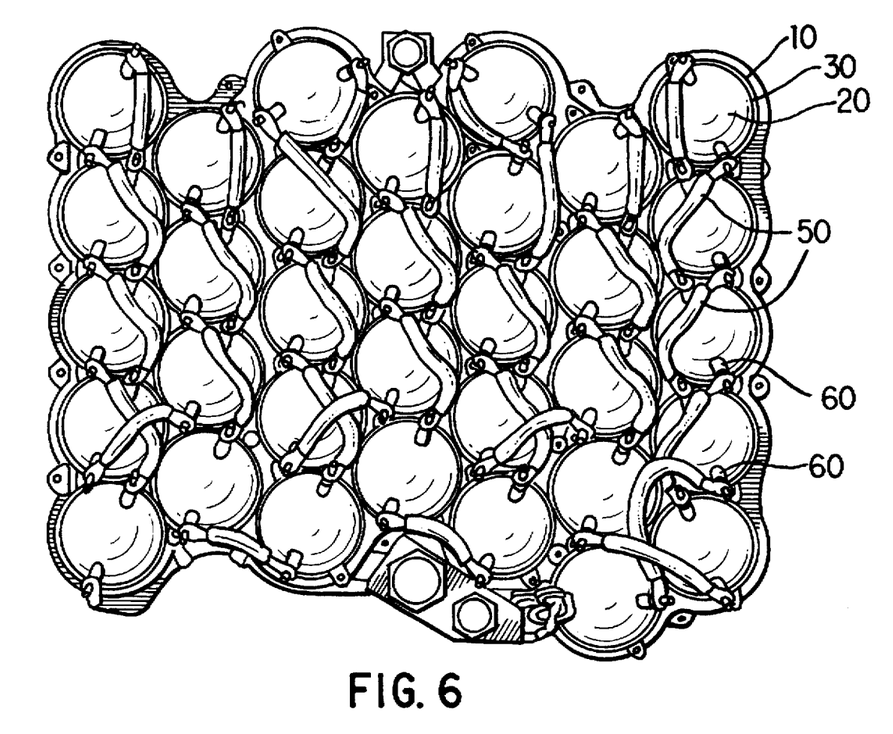
FIG. 6 is a top view of the battery housing with the battery cells installed, showing the wiring connections between the electrodes of the different battery cells.

FIG. 6 illustrates a top view of the battery cell 20 and collar 30 assemblies securely mounted in the battery housing 10, as well as the interconnect wiring 50 between the electrodes 60 of the different battery cells 20. The electrodes may also be connected via bus bars. The electrodes 60 may be of any suitable type, for example, "rabbit ear" (shown in FIG. 3) or axial electrodes. In the axial electrode configuration, one electrode is located at the top of the battery cell and the other is located at the bottom of the battery cell.

If "rabbit ear" electrode battery cells are employed, the collar 30 need only be inwardly tapered at one end to match the inward taper 12b of the battery cell receptacle 12. If axial electrode battery cells are employed, the collar 30 could have a dual tapered design, where both ends of the collar 30 are inwardly tapered. This allows the axial electrode battery cell to be installed in the battery cell receptacle 12 in either an upward or downward orientation.

The split ring 35 design shown in FIGS. 4A and 4B allows the battery assembler to expand the diameter of the collar to accommodate an adhesive 54 and an electrically insulating material 52, both of which are described hereinafter. The split ring 35 is essentially a longitudinal slit extending along a length of the collar 30. Not only does this design reduce weight, it also increases the ease of manufacturing and producing the battery.

Figure 4A:
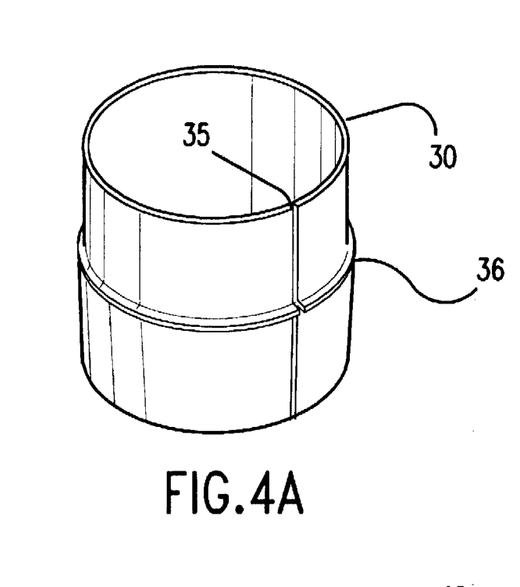
FIG. 4A is a perspective view of the collar of the present invention.
Figure 4B:
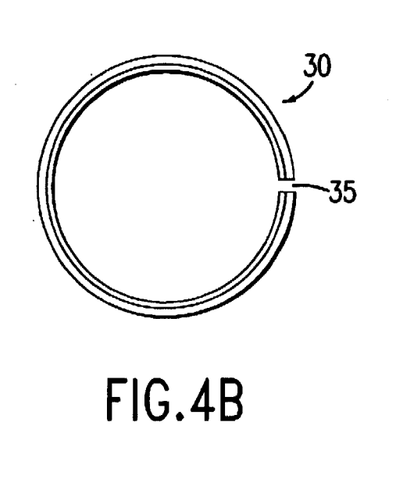
FIG. 4B is a top view of the collar of FIG. 4A.
Figure 4C:
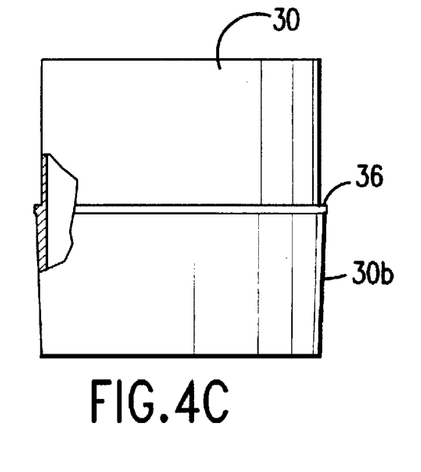
FIG. 4C is a side view of the collar of FIG. 4A.
Figure 5A:
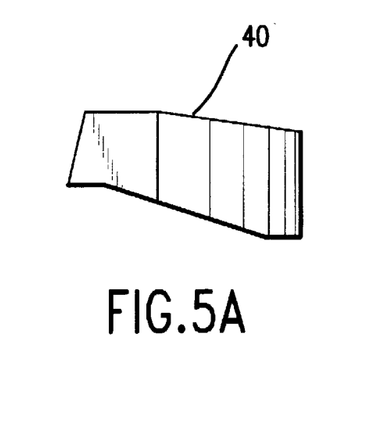
FIG. 5A is a side view of the retaining tab of the present invention.
Figure 5B:
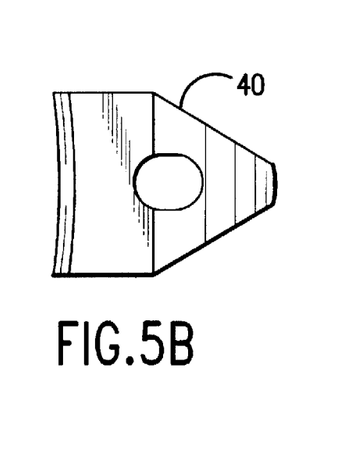
FIG. 5B is a top view of the retaining tab of FIG. 5A.

As shown in FIGS. 4A and 4C, the collar 30 also contains a clamping ridge 36. Retaining tabs 40, shown in FIGS. 1B, 5A, and 5B, are used to secure the cell/collar assemblies to the battery housing 10. The retaining tabs 40 may be made of aluminum, and may be integrally formed with the respective collars 30 or the retaining tabs 40 may comprise a separate structure. In either case, one end of the retaining tabs 40 grips the clamping ridge 36 and the other end of the retaining tabs 40 grips the battery housing 10 to secure the cell/collar assemblies to the housing 10. Therefore, the battery apparatus of the present invention may be rotated through any angle without displacing any of the cell/collar assemblies. This clamping configuration also eliminates the need to preposition or "clock" each battery cell with each collar, since all clocking can be accomplished during the cell/collar package installation into the battery housing. The clocking is required to position the cell electrodes for interconnect wiring.

Figure 7:
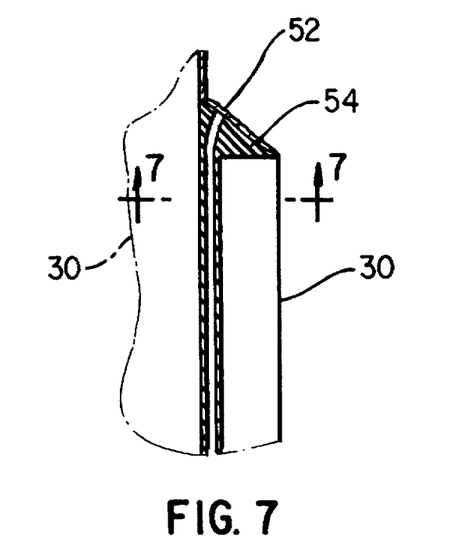
FIG. 7 is a cross sectional view of a portion of FIG. 3, taken along the line 7—7, showing the interface between the cell and collar of the present invention.

Each of the cell cases are at different electrical potentials and require electrical insulation from one another. Therefore, as shown in FIGS. 1B and 7, the battery cells 20 are insulated from the cell collars 30 by a fiberglass wrap 52 embedded in an electrically insulating adhesive 54. The fiberglass wrap 52 completely encompasses the cell 20 in the area of the collar 30 as shown in FIG. 1B. An adhesive, such as Nusil CV-2942 RTV, may be used to bond the cell/collar packages together. It is understood that other suitable adhesives 54 may be used in the practice of this invention. Preferably, the adhesive 54 is thermally conductive and electrically insulating, thereby providing a second layer of electrical isolation without penalizing thermal performance.

The adhesive material 54 is used as an interstitial material to enhance thermal performance across the tapered interface (12b –30b as shown in FIG. 3) described above. Since the surface taper 30b of the collar 30 is identical to the taper 12b used in the battery cell receptacles 12, the interstitial adhesive 54 material ensures that more than a line contact is made. All the heat from the battery cells 20 conducts through this interface. The Nusil CV-2942 RTV was chosen for its good thermal characteristics as well as the fact that it has been proven as a good thermal grease replacement. Although this RTV adhesive is electrically insulating, the collars and battery housing are electrically conductive due to the retaining tabs 40.

The completed battery apparatus may be mounted to a heat rejection surface, either a coldplate or space radiator, by using fasteners with an interstitial material therebetween. Depending on the mission requirements, this interstitial material could be a thermal grease or CV-2942 RTV equivalent adhesive.

The battery apparatus of the present invention is designed for use in LEO satellites, but could be used in all types of spacecraft including geosynchronous orbit satellites. The battery design can be used in many of the commercial communications satellites that are presently being placed in orbit, and may also be adapted for ground or other airborne applications.

As described above, the number of cells in the battery design may be scaled up or down, and the physical battery footprint for a given number of cells or battery voltage can be altered to fit within a given geometric requirement, whether square, rectangular, etc. In addition, the battery design may be scaled up or down based on cell capacity. The disclosed embodiment is based on a 3.5 inch diameter cell, but the design can be modified to accommodate a 4.5 inch or larger diameters, for example. As the cell capacity is increased, the battery housing height and collar size increase accordingly. A selected number of the available battery cells 20 within the battery housing 10 may be connected to accommodate a requirement for less cells than the rated capacity of the total available battery cells 20. For example, if only 11 cells of a 22 cell battery are required, the battery cells may be interconnected accordingly.

The battery design of the present invention is a self-contained mass that structurally and thermally acts as a single entity, requires little supporting structure, and minimizes structural and thermal constraints on the spacecraft. The battery design provides uniformity in battery cell temperatures, that is, a small cell to cell temperature gradient, while minimizing the cell stack temperatures. Within the cell electrode stack, the top of the cell to middle of the cell temperature difference is similar to the bottom of the cell to the middle of the cell temperature difference. The battery design provides uniform cell voltages and minimizes cell voltage spreading.

The battery components, collar, retaining tabs and housing are easily machined from stock aluminum material. The battery is easily assembled with little support equipment required. The battery easy to handle, requires only a standard flatness, and requires no special thermal control features (e.g., temperature or heat rejection uniformity, forced cooling, etc.) of the mounting surface. The cell collar design can be used with cells of different suppliers for a given cell capacity without modification. The $NiH_2$ cell/collar assemblies are easily removed and replaced within the battery cell for cell repair or replacement.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

Having thus described my invention, what we claim as new and desire to secure by Letters Patent is as follows:

1. A battery apparatus, comprising:
   a battery housing having a plurality of battery cell receptacles, each of said battery cell receptacles having an inwardly tapered opening;
   a plurality of battery cells inserted in respective ones of said battery cell receptacles;
   a plurality of collars secured to and surrounding respective ones of said battery cells, each said collar being located at a central portion of a respective one of said battery cells, and having an upper portion extending a prescribed distance above a plane defined by a top of the battery housing and a lower portion extending below the top plane of the battery housing, said lower portion of the collar being inwardly tapered, the inward taper of the battery cell receptacle matching the inward taper of the lower portion of the collar;
   interconnect means for electrically interconnecting at least selected ones of the battery cells to one another; and
   a plurality of retaining tabs for securing respective ones of the battery cells and the collars to said battery housing.

2. The battery apparatus set forth in claim 1, further comprising an adhesive material applied to a surface of the central portion of each battery cell, said adhesive material bonding to an inner surface of the respective collar.

3. The battery apparatus set forth in claim 1, wherein said battery housing has a height which is selectively adjustable on the basis of a height of said battery cells.

4. The battery apparatus set forth in claim 1, wherein said prescribed distance is selectively adjustable on the basis of a height of said battery cells.

5. The battery apparatus set forth in claim 1, wherein each of said battery cells includes rabbit ear electrodes.

6. The battery apparatus set forth in claim 1, wherein each of said battery cells includes axial electrodes.

7. The battery apparatus set forth in claim 1, wherein each said collar includes a longitudinal slit extending along a length of the collar to enlarge a diameter of said collar.

8. The battery apparatus set forth in claim 7, wherein:

each said collar further comprises a clamping ridge; and one end of a respective one of said retaining tab grips said clamping ridge and another end of the respective one of said retaining tab grips said housing so as to secure the respective collar and battery cell to said battery housing.

9. The battery apparatus set forth in claim 2, further comprising an electrically insulating material embedded in said adhesive material.

10. The battery apparatus set forth in claim 9, wherein said electrically insulating material comprises fiberglass wrap.

11. The battery apparatus set forth in claim 10, wherein said adhesive material is thermally conductive and electrically insulating.

12. The battery apparatus set forth in claim 1, wherein said housing, collars, and retaining tabs are each made of aluminum.

13. The battery apparatus set forth in claim 1, wherein said battery cells are $NiH_2$ battery cells.

14. The battery apparatus set forth in claim 13, wherein said battery cells are cylindrical independent pressure vessel $NiH_2$ battery cells.

15. The battery apparatus set forth in claim 13, wherein said battery cells are common pressure vessel $NiH_2$ battery cells.

16. The battery apparatus set forth in claim 1, wherein said interconnect means comprises interconnect wiring.

17. The battery apparatus set forth in claim 1, wherein said interconnect means comprises bus bars.

18. The battery apparatus set forth in claim 1, wherein said battery cell receptacles are cylindrical.

19. The battery apparatus set forth in claim 1, wherein at least selected ones of said battery cell receptacles are vertically stacked.

20. The battery apparatus as set forth in claim 1, wherein said battery cell receptacles are arranged in a prescribed geometric configuration.

21. The battery apparatus as set forth in claim 1, wherein said battery cell receptacles are arranged in a polygonal configuration.

22. The battery apparatus as set forth in claim 1, wherein said battery cell receptacles are arranged in a circular configuration.

23. The battery apparatus as set forth in claim 1, wherein said retaining tabs are integrally formed with respective of said collars.

* * * * *